US012704106B2

(12) United States Patent
Johnson et al.

(10) Patent No.: US 12,704,106 B2
(45) Date of Patent: Aug. 11, 2026

(54) WAVE POWERED GENERATOR DEVICE AND SYSTEM

(71) Applicants: Shawn Michael Johnson, Rockport, TX (US); Joseph Pandak, Kemah, TX (US); Ernest Fontenot, Spring, TX (US)

(72) Inventors: Shawn Michael Johnson, Rockport, TX (US); Joseph Pandak, Kemah, TX (US); Ernest Fontenot, Spring, TX (US)

(73) Assignee: WAVE POWER GENIUSES LLC, Kemah, TX (US)

( * ) Notice: Subject to any disclaimer, the term of this patent is extended or adjusted under 35 U.S.C. 154(b) by 0 days.

(21) Appl. No.: 18/737,801

(22) Filed: Jun. 7, 2024

(65) Prior Publication Data

US 2025/0297591 A1 Sep. 25, 2025

Related U.S. Application Data

(60) Provisional application No. 63/507,095, filed on Jun. 8, 2023.

(51) Int. Cl.
*F03B 13/00* (2006.01)
*F03B 13/18* (2006.01)

(52) U.S. Cl.
CPC .... *F03B 13/1825* (2013.01); *F05B 2220/706* (2013.01); *F05B 2260/4031* (2013.01)

(58) Field of Classification Search
CPC ............ F03B 13/1825; F05B 2220/706; F05B 2260/4031
See application file for complete search history.

(56) References Cited

U.S. PATENT DOCUMENTS 3,930,168 A 12/1975 Tornabene
7,841,177 B1 * 11/2010 Detwiler .............. F03B 13/186 60/497

(Continued)

FOREIGN PATENT DOCUMENTS

| | | |
|---|---|---|
| CN | 108825427 | 5/2020 |
| DE | 102009039214 | 3/2011 |
| WO | WO 2024/249258 | 12/2024 |

OTHER PUBLICATIONS

PCT International Search Report of PCT/US2024/030781 published on Aug. 20, 2024 by WIPO.

(Continued)

*Primary Examiner* — Julio C. Gonzalez
(74) *Attorney, Agent, or Firm* — Schrantz Law Firm, PLLC; Stephen D. Schrantz

(57) ABSTRACT

The wave powered generator device and system provides a system for generating electricity using wave energy. The force exerted on the float body by the waves moves the float body in two directions, up and down. The float body aligns toothed rails with rail gears that drive the PTO. The toothed rails secured to the float body travel vertically in relation to the rail gears. The vertical motion of the neck and the float body moves the toothed rails in relation to the rail gears. Such vertical motion of the toothed rails rotates the rail gears to drive the generator to generate electricity. The toothed rails are located on opposite sides of the rail gears to generate electricity during bi-directional movement of the neck, the float body, and the rail gears.

10 Claims, 11 Drawing Sheets

(56) References Cited

U.S. PATENT DOCUMENTS

| | | | | |
|---|---|---|---|---|
| 10,227,961 | B2 * | 3/2019 | Dragic | F03B 13/20 |
| 2009/0072540 | A1 * | 3/2009 | McCague | F03B 13/186 290/53 |
| 2010/0213710 | A1 | 8/2010 | Rhinefrank et al. | |
| 2011/0140454 | A1 | 6/2011 | Earl | |
| 2013/0056988 | A1 | 3/2013 | Hunt et al. | |
| 2013/0160444 | A1 | 6/2013 | Foster et al. | |

OTHER PUBLICATIONS

PCT Written Opinion of the International Searching Authority of PCT/US2024/030781 published on Aug. 20, 2024 by WIPO.

PCT International Search Report and Written Opinion of the International Searching Authority of PCT/US2025/032737 published on Aug. 1, 2025.

* cited by examiner

WAVE POWERED GENERATOR DEVICE AND SYSTEM

CROSS-REFERENCE TO RELATED APPLICATIONS

This application claims priority to and is a continuation in part of U.S. Patent Application No. 63/507,095 filed on Jun. 8, 2023 entitled WATER POWERED GENERATOR DEVICE AND SYSTEM.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the methods and systems for generating electric energy from wave motion. More specifically, the present invention relates to methods and systems for converting bidirectional wave motion into unidirectional or bidirectional rotary movement. More specifically, the present invention is installed in or near the ocean or another body of water to transfer wave motion to moving a float body that drives a generator.

II. Description of the Known Art

Ocean energy has the potential to become the forerunner in renewable energies available around the world. Despite the numerous attempts to harness this energy, only a few have been successful. The known art falls short of creating a viable solution. Certain problems exist with the known art. The known art does not provide an effective solution for generating electricity from wave energy.

The present invention is needed to provide a unique generator for generating electricity from wave energy.

SUMMARY OF THE INVENTION

The present invention provides energy converting systems for generating electricity. In one exemplary embodiment, the energy converting system includes a housing, at least one drive housing, a float body, and a toothed rail secured to a neck of the float body for driving a generator. The drive housing provides a central opening in which the neck of the float body is maintained to allow limited movement of the neck and the float body. The neck of the float body is positioned within the central opening for vertical movement within the central opening of the drive housing. The drive housing maintains the neck within the central opening. The float body is made of a material that permits the float body to float in water.

The energy conversion systems, such as a toothed rail, is secured to the neck of the float body to allow for vertical movement of the toothed rail in relation to a rail gear that is secured to the housing. The rail gear is secured to a ratio gear that drives the drive gear of the generator. The motion of the neck and the float body vertically moves the toothed rails in relation to the rail gears. Vertical movement of the toothed rails rotates the rail gears, the ratio gear, and the drive gear to drive the generator to generate electricity. The bidirectional motion of the float body and the toothed rails in relation to the rail gears causes the energy converting system to generate electricity.

It is an object of the present invention to generate electricity from wave energy.

It is also an object of the present invention to harness wave energy.

It is also an object of the present invention to transfer wave energy to drive a generator.

It is also an object of the present invention to drive a generator by wave movement transferred to a float body within a body of water.

It is also an object of the present invention to generate energy in or near a body of water with wave motion, such as a coastline, lake, ocean, bay, or other body of water.

In addition to the features and advantages of the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
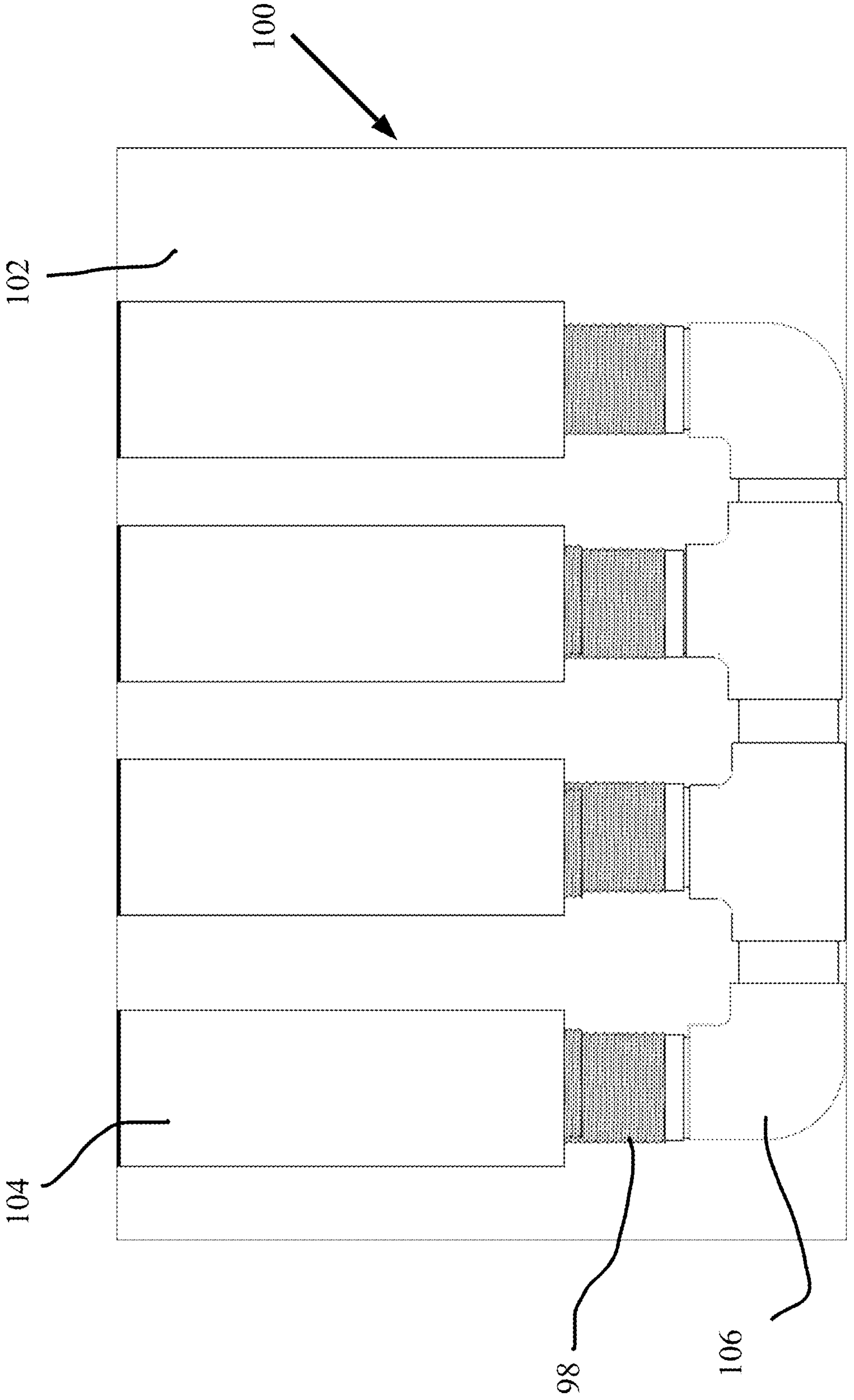
FIG. 1 is right side view of the wave powered generator device and system of the present invention.

FIG. 1 generally shows the wave powered generator device and system as 100. The generator system 100 converts wave energy to electrical energy. The generator system 100 installs within water to harness the bidirectional wave motion of water. The housing 102, such as a bulkhead, installs within the water for contact with the wave energy.

The housing 102, such as the bulkhead, installs within the water to reduce movement of the housing 102 while allowing movement of the float body 106. Float body 106, may be a Styrofoam body, a buoyant body, a floating housing with internal air bladder, an air bladder, an inflatable tube, or other buoyant body that moves with the wave movement of the water.

Float body 106 moves vertically in a first direction and an opposite second direction within drive housing 104. Flexible seal 98 attaches to the float body 106 and extends to the drive housing 104 to seal the wave drive system within the drive housing 104 and the housing 102.

FIG. 1 shows the drive housing 104 as an exterior portion of the housing 102. The drive housing 104 may also be located within the main housing of housing 102. The drive housing 104 may be located interior or exterior of the housing 102.

Figure 2:
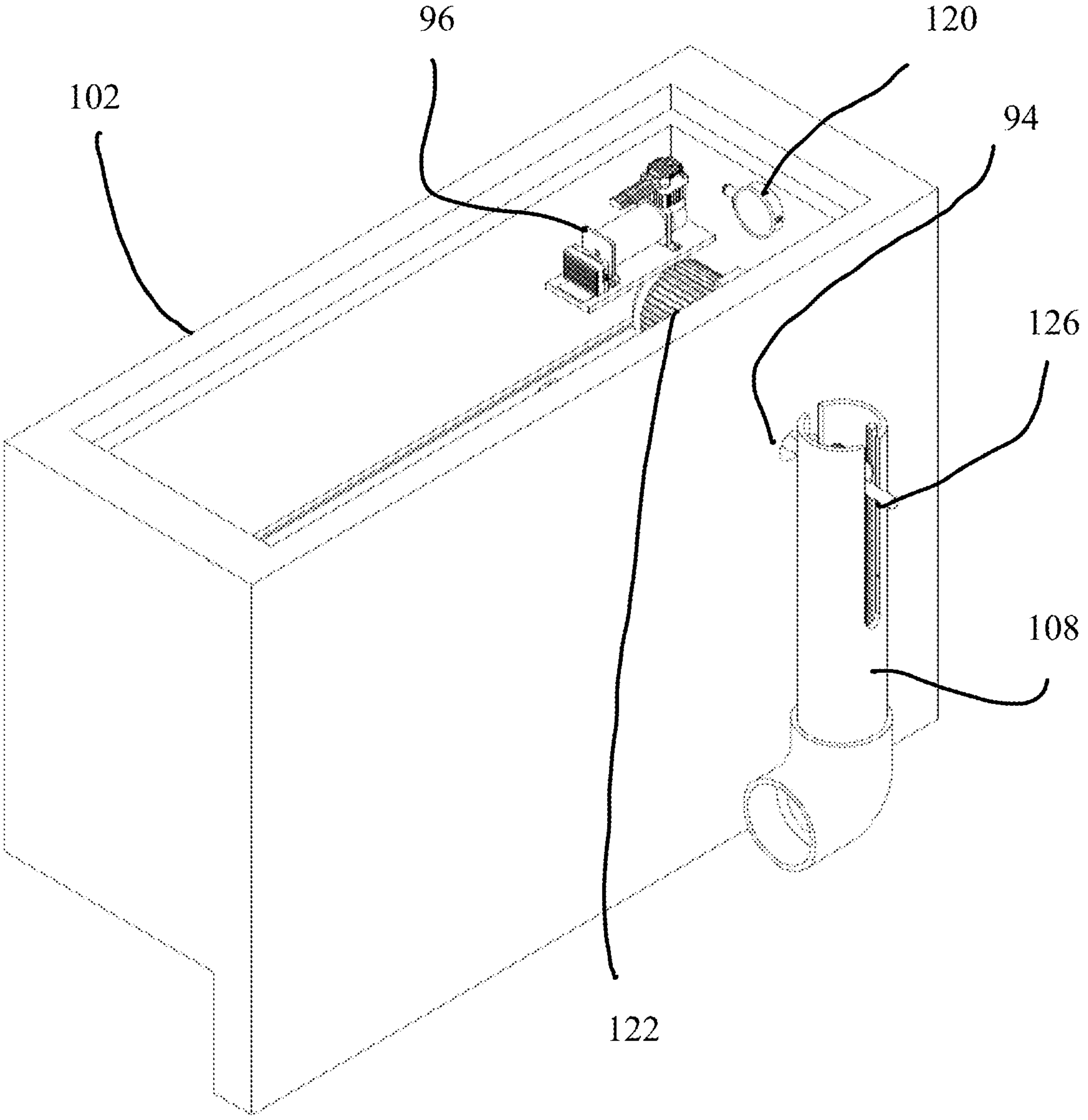
FIG. 2 is a partial perspective top view thereof.
Figure 3:
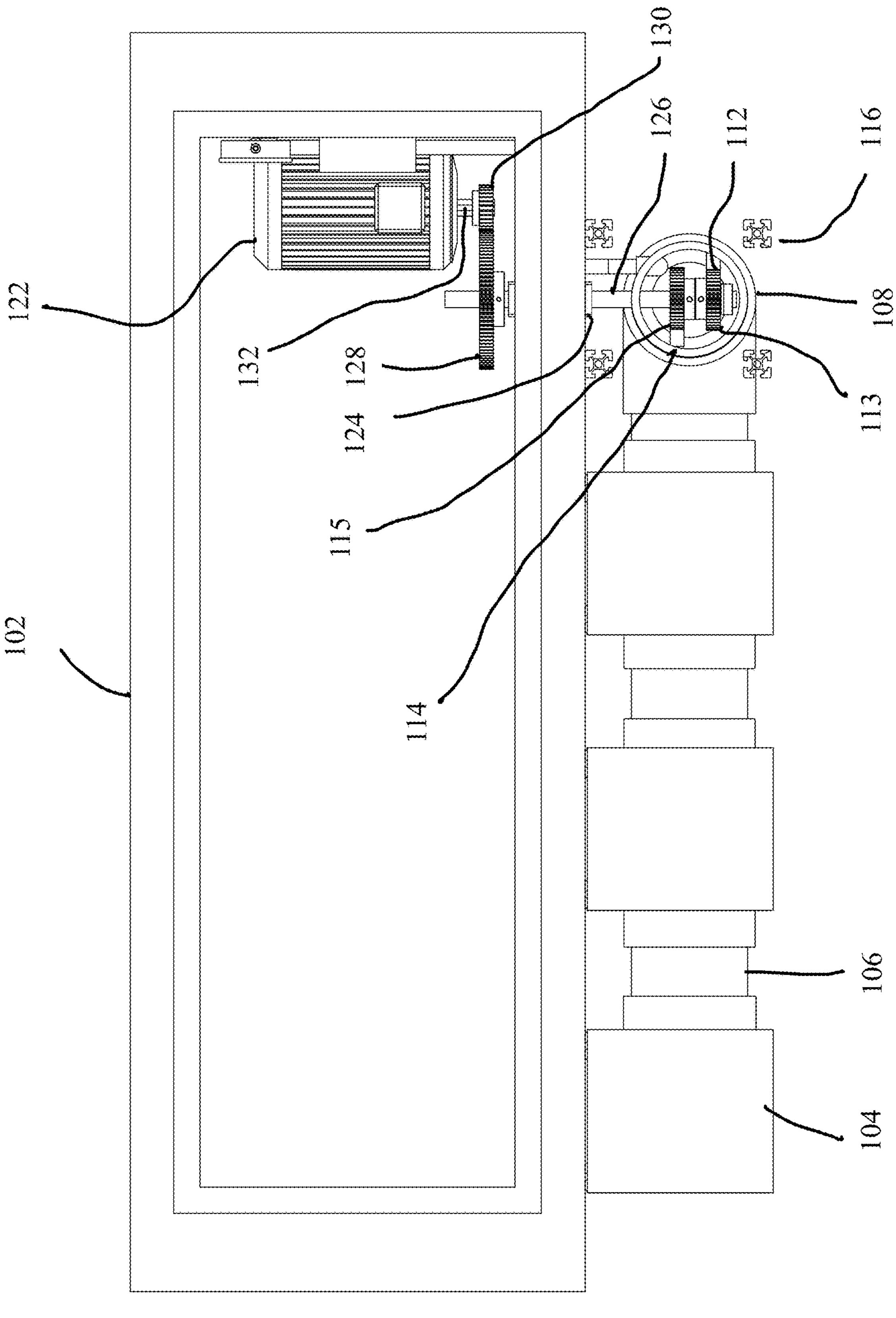
FIG. 3 is a partial top view thereof.

Referring to FIGS. 1-3, the wave drive system 110 installs within the drive housing 104 secured to the housing 100. The float body may be buoyant with or without an air bladder. One embodiment may have a float body that has a fixed buoyancy. Another embodiment provides variably buoyance in the float body.

In one embodiment, an air bladder within float body 106 provides variable buoyancy on the float body 106. Pump 96 and a pressure regulator secured to the air bladder may increase or decrease the air pressure within the air bladder to vary the buoyancy of the float body 106 depending on the wave conditions. The air bladder within float body 106 controls the buoyancy factor during different tidal events to maintain a constant bidirectional wave motion.

A neck 108 is secured to the float body 106. The neck 108 extends vertically from float body 106. The neck 108 is positioned within the drive housings 104. The drive housing and guide legs are not shown to show the neck 108.

The drive housing and the neck are removed to show the guide legs 116 installed within each drive housing 104. The guide legs 116 guide the neck 108 for the vertical movement within each drive housing 104. The guide legs 116 secure to the drive housings 104 secured to the housing 102, such as a bulkhead. The guide legs 116 allow the neck 108 of the float body 106 to move in phase with the bidirectional wave motion.

Rail gears of the wave drive system 110 secure to an axle 126 that extends into the housing 102 at aperture 94. Rotation of the rail gears drives the generator 122 to generate electricity. The axle 126 extends into the housing 102 at bearing 124 for driving the generator. The axle 126 passes through a pre-installed aperture 94 within the housing 102 made during the fabrication process. The drive housing has been removed for viewing the components stored within the drive housing. The neck and rail gears are located within the drive housing 104.

In one embodiment, the rail gears drive the generator to generate electricity when rotating in a generate direction, such as clockwise. The rail gears spin freely from the generator in the non-generate direction. The rail gears do not drive the generator to generate electricity when rotating in the non-generate direction. In one embodiment, one-way clutches coupled with the rail gears direct the rail gears to drive the generator when rotating in the generate direction. The rail gears rotate freely from the generator when rotating in the non-generate direction. In one embodiment, the generate direction is clockwise. The non-generate direction is the opposite of the generate direction, such as counterclockwise. The rotation of the rail gears may be reversed such that the generate direction is counterclockwise and the non-generate direction is clockwise.

In one embodiment, rail gears 113, 115 are secured to an axle 126. The rail gears 113, 115 rotate the axle 126 in the generate direction to drive the generator to generate electricity. The rail gears 113, 115 rotating in the non-generate direction spin freely from the axle 126 such the rail gears 113, 115 do not drive the generator.

Movement of the toothed rails 112, 114 rotate the rail gears 113, 115. Toothed rails 112, 114 of the wave drive system 110 secured to the neck 108 of the float body 106 move vertically in relation to the rail gears 113, 115. The rail gears 113, 115 rotate in a fixed position on the axle 126 due to the movement of the toothed rails 112, 114 in a first and second direction.

The toothed rails 112, 114 drive the rail gears 113, 115 as the neck 108 moves vertically due to the waves. As the neck 108 moves in an upward motion, the toothed rails 112, 114 also move upwards. As the neck 108 moves in a downward motion, the toothed rails 112, 114 also move downwards. The toothed rails are located on opposite sides of each rail gear to drive the respective rail gears in opposite directions during vertical movement of the toothed rails 112, 114 in different directions.

The rail gears of one embodiment couple with a one-way clutch to allow each gear to spin freely in a non-generate direction. For example, a first toothed rail moves in a first vertical direction, such as downward, to drive the first rail gear in a generate direction. The first rail gear spins freely in the non-generate direction during movement of the first toothed rail in a second direction, such as a second vertical direction, such as upward. The second toothed rail 114 moving in the second direction, such as upward, drives the second rail gear in the generate direction. The second rail gear spins freely in the non-generate direction during movement of the second toothed rail in the first direction.

The rail gears drive the generator during both the upward motion and the downward motion of the wave. A first rail gear drives the generator during movement of the float body in the first direction. The second rail gear drives the generator during movement of the float body in the second direction. The rail gears and the toothed rails drive the generator to generate electricity during both the upward and downward motions of the wave.

Continuing to refer to FIGS. 2 and 3, the wave drive system 110 drives the rail gears 113, 115 and the drive shaft 132 of the generator 122 to generate electricity during movement of the neck 108 in a first direction, such as downward, and a second direction, such as upward. One-way clutches secured to the first rail gear 113 and the second rail gear 115 allow the rail gears 113, 115 to rotate freely from the axle in the non-generate direction. The first rail gear 113 rotates freely in the non-generate direction as the first toothed rail 112 moves in the second vertical direction. The second rail gear 115 rotates freely in the non-generate direction as the second toothed rail 114 moves in the first vertical direction.

A first rail gear 113 drives the generator 122 to generate electricity during movement of the first toothed rail 112 in the first direction, such as downward. As the neck 108 and first toothed rail 112 move in the first direction, such as a downward motion, the first toothed rail 112 drives the respective first rail gear 113 to rotate in a generating direction (clockwise) that drives the drive shaft 132 of the generator. The first rail gear 113 coupled with the one-way clutch rotates the axle 126 in the generate direction during the movement of the first toothed rail 112 in the first direction, such as downward.

The second toothed rail 114 also moves in the first direction, such as downward, with the neck 108. The second toothed rail 114 is located on an opposite side of the first toothed rail 112. The second rail gear 115 coupled with the one-way clutch spins freely from the axle 126 as the neck 108 and second toothed rail 114 move in the first direction, such as the downward motion. The second rail gear 115 rotates freely in the non-generate direction during movement of the second toothed rail 114 in the first direction such that the second rail gear 115 does not drive the axle 126 and the drive shaft 132 of the generator 122.

The wave drive system 110 also drives the generator to generate electricity during movement of the neck 108 in the second direction, such as upward. A second rail gear 115 drives the generator to generate electricity during movement of the neck 108 in the second direction, such as upward. As the neck 108 and second toothed rail 114 move in the second direction, such as an upward motion, the second toothed rail 114 drives the respective second rail gear 115 in the generating direction, such as clockwise, that drives the axel and the drive shaft of the generator.

The first toothed rail 112 also moves in the second direction, such as upward, with the neck 108. The first toothed rail 112 is located on an opposite side of the second toothed rail 114. The first rail gear coupled with the one-way clutch spins freely as the neck 108 and first toothed rail 112 move in the second direction, such as the upward motion. The first rail gear 113 spins freely in the non-generating direction during movement of the first toothed rail 112 in the second direction such that the first rail gear 113 does not drive the generator and drive shaft during movement of the first toothed rail 112 in the second direction.

The relationship between the rail gears 113, 115 coupled with the one-way clutches, toothed rails 112, 114, and axle with ratio gear ensures continuous rotation by the wave drive system 110 during the wave motion in two directions, a first vertical direction and a second vertical direction. When rail gear 113, 115 is engaged with the wave drive system 110 and not spinning freely, the rail gears 113, 115 rotate the ratio gear 128. The ratio gear 128 is engaged with the drive gear 130 that drives the drive shaft 132, such as a PTO of the generator 122. The ratio between the ratio gear 128 and the drive gear 130 will depend on the required RPM of the generator 122, such as a PTO generator. This ratio can also be adjusted to overcome some losses during the process.

The alignment of the neck 108 within the drive housing 104 by the guide legs 116 engages the rail gears 113, 115 with the toothed rails 112, 114. The guide legs 116 and drive housings 104 maintain the free floating neck 108 to limit movement of the neck 108 vertically to maintain the neck 108 within the drive housing 104 and not extend through the top of the drive housing 104. The drive housing 104 maintains the neck 108 within the drive housing 104 to limit the neck 108 from escaping the drive housing 104.

The guide legs 116 and drive housings 104 also limit lateral movement of the neck 108 within the drive housings 104. The guide legs 116 align the toothed rails 112, 114 within the neck 108 with the rail gears 113, 115. The guide legs 116 limit the opportunity for the toothed rails 112, 114 to offset from the rail gears 113, 115.

The drive housing 104 extends laterally from the housing 100, such as a bulkhead adding a layer of rigidity. The guide legs 116 secured interior of the drive housing 104 maintain the neck 108 vertically while mitigating any distortion that offsets the neck 108. To reduce contact friction between the guide legs 116 and the neck 108, friction reducers are applied to the guide legs 116 between the guide legs 116 and the neck 108 in one embodiment.

Figure 4:
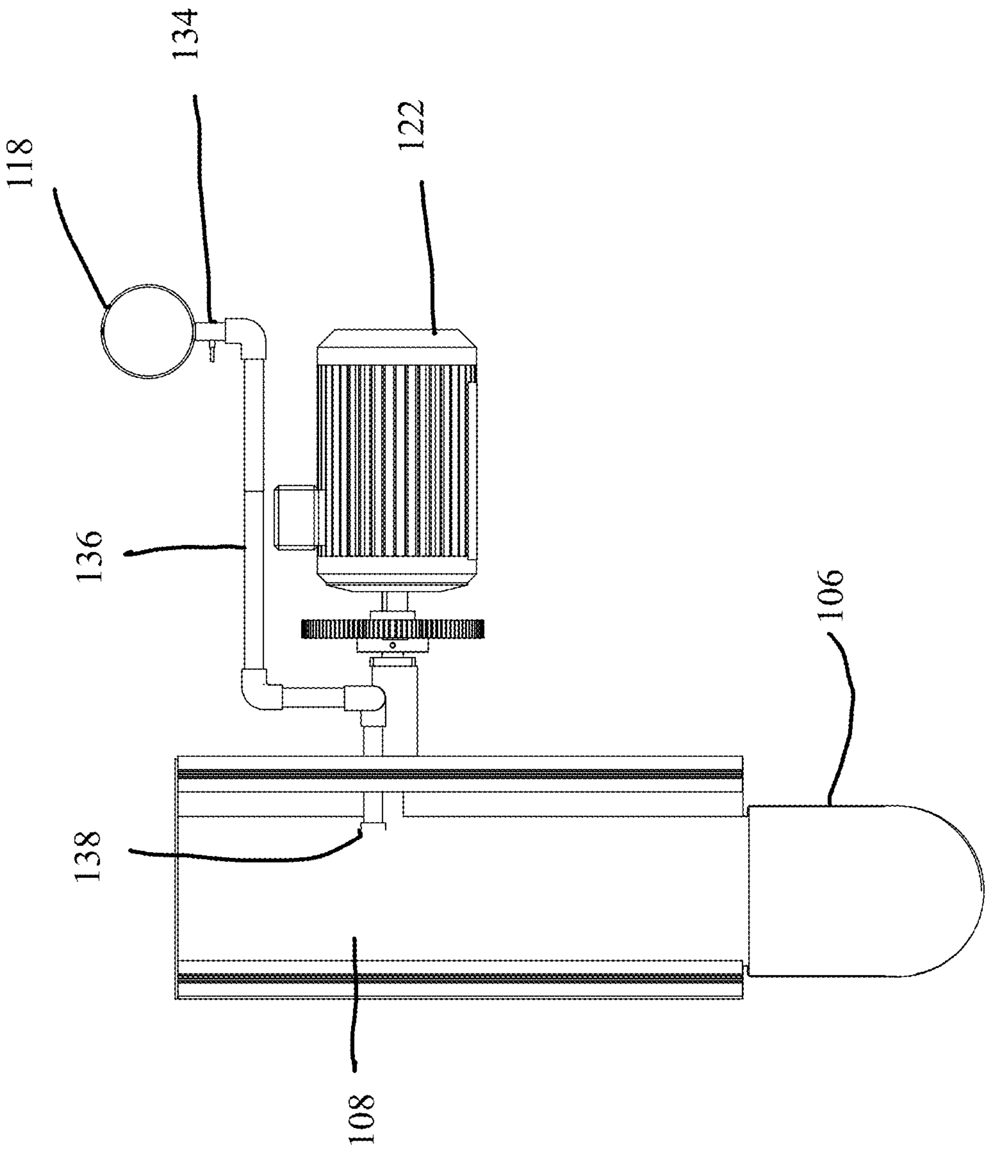
FIG. 4 is a partial top view thereof.

FIG. 4 shows an optional air bladder 138 installed within the float body 106 of one embodiment. Air pump inflates the air bladder 138 to adjust the buoyancy of the float body 106. Adjustment of the buoyancy of the air bladder 138 reduces friction losses and the losses due to tidal events. The air bladder 138 maintains a constant bidirectional motion (first vertical direction and second vertical direction) of the neck 108 and float body 106 by increasing or decreasing the internal pressure of the air bladder 138 to vary the buoyancy values of float body 106 and neck 108.

An air regulator system controlled by controller 120 (shown in FIG. 1) modifies the buoyancy values during various tidal events. Pump 96 and pressure regulator 134 regulates the air pressure of the bladder 138. Controller 120 regulates the pressure via pump 96 and pressure regulator 134. Conduit 136 connects the pump 96, pressure gauge 118, and pressure regulator 134 with the air bladder 138.

The float body of other embodiments may vary buoyancy by adding air or other gases via a tank or cylinder of compressed gas. The gas may be air, helium, or other gas. An air compressor may also vary the buoyancy of the float body. The float body may also be manually adjusted to vary the buoyancy. Another embodiment may provide a float body having a fixed buoyancy.

Figure 5:
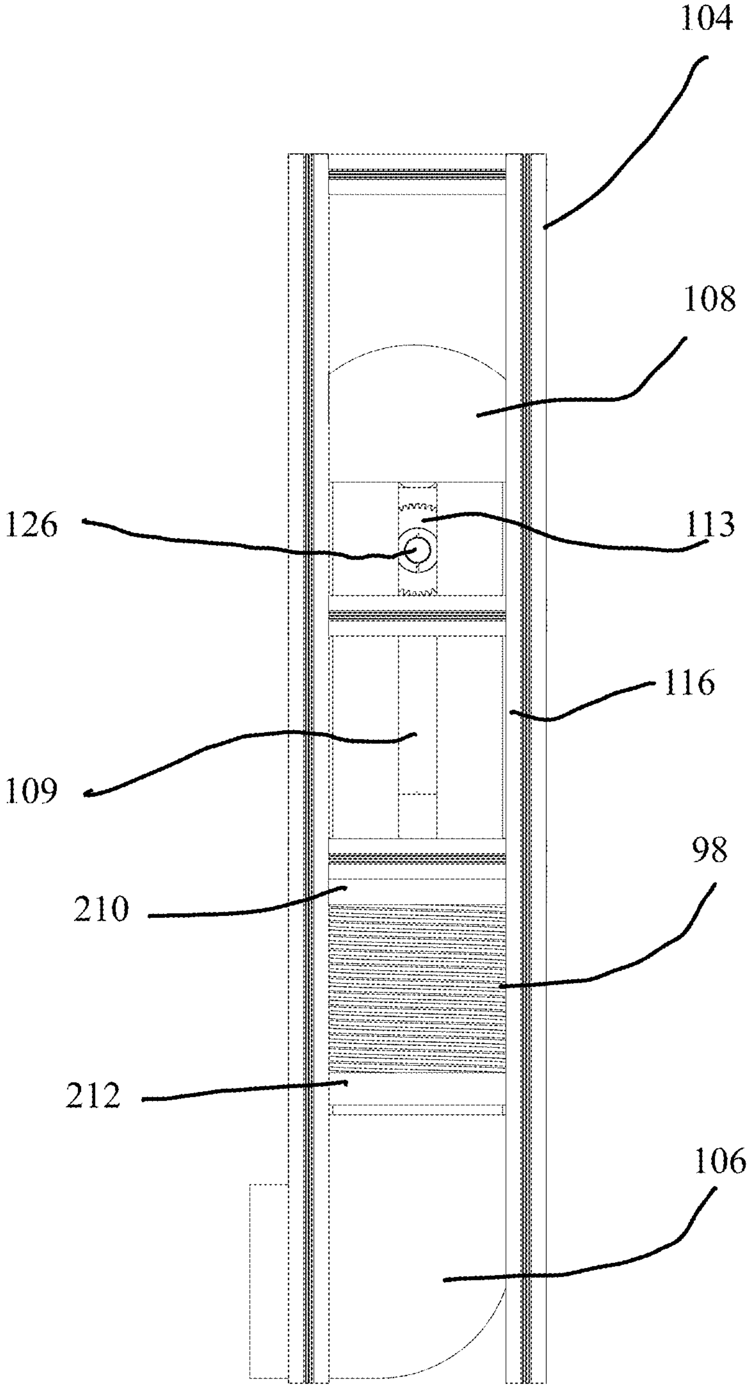
FIG. 5 is a partial right side view thereof.

FIGS. 3 and 5 show the guide legs 116 secured to the drive housing 104. Guide legs 116 remain fixed in relation to the drive housing 104. The guide legs 104 reduce movement of the neck 108 within the drive housing 104 that may offset the rail gears 113, 115 from the toothed rails.

Vertical aperture 109 enables the vertical movement of the neck 108 within the drive housing 104. Axle 126 secures the drive gear that drives the drive shaft of the generator with the rail gears 113, 115. Rotation of the rail gears 113, 115 drives the drive shaft. Axle 126 passes from inside the neck 108 and drive housing 104 into the housing with the generator.

Flexible seal 98, such as an accordion style sealing body, promotes the vertical movement of the neck 108 within the drive housing 104. The flexible seal 98 limits water, such as salt water and other fluids, entering the neck 108, the drive housing, and the housing.

Figure 6:
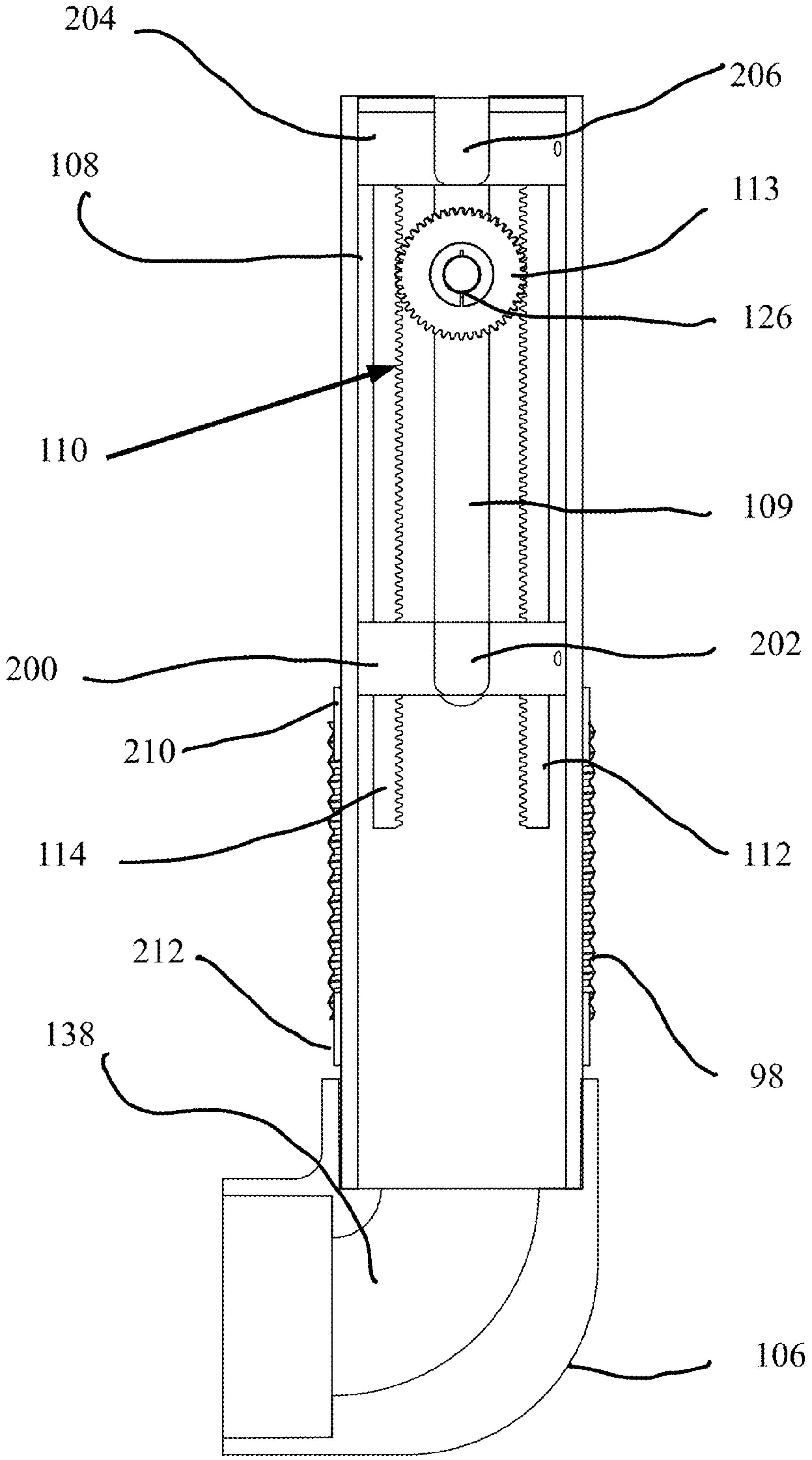
FIG. 6 is a partial right side view of the wave drive system of one embodiment of the present invention.

FIG. 6 shows the drive system 110 with the rail gears 113 (rail gear 115 is located behind rail gear 113) on axle 126. Toothed rails 112, 114 secured to neck 108 travel up and down across opposite sides of rails gears 113, 115. As discussed above, the different rail gears 113, 115 drive the axle 126 during the up and down movement of the neck 108.

An air bladder 138 within float body of one embodiment controls the buoyancy of the float body 106 during the tidal events. As discussed above, the air bladder 138 attaches to conduit 136 for controlling the pressure within the air bladder 138. The float body 106 of one embodiment may not include an air bladder as discussed above.

Vertical aperture 109 in neck 108 allows the neck 108 to travel vertically in the drive housing 104. Axle 126 extends through the rail gears 113, 115 and the vertical aperture 109 for rotating the axle 126 during the vertical movement of the neck 108 and the attached toothed rails 112, 114.

FIGS. 5 and 6 show the attachment of flexible seal 98 to the neck 108 and the drive housing 104. Waves and the water apply force to the float body 106 for the vertical movement of the neck 108 and the attached tooth rails 112, 114. Flexible seal 98, such as an accordion style sealing body, attaches to an exterior of the neck 108 at a lower attachment and the drive housing 106 at an upper attachment. The flexible seal 98 seals between the neck 108 and the drive housing 104. The flexible seal 98 limits the water and other fluids that enter the neck 108 and the drive housing 104. The flexible seal 98 limits the exposure of the rails 112, 114, rail gears 113, 115, drive system 110, and the generator to the water (salt water).

Seal collars 210, 212 secure the flexible seal 98 to the drive housing 104 and the neck 108. Upper seal collar 210 secures to the drive housing 104. Lower seal collar 212 secures to the exterior of neck 108. The flexible seal 98 seals from the neck 108 to the drive housing 104. The neck 108 moves vertically in relation to the upper seal collar 210. The neck 108 moves vertically in the first and second direction through the upper seal collar 210 to rotate the gears with the toothed rails 212, 214. Lower seal collar 212 remains fixed to the neck 108.

Figure 7:
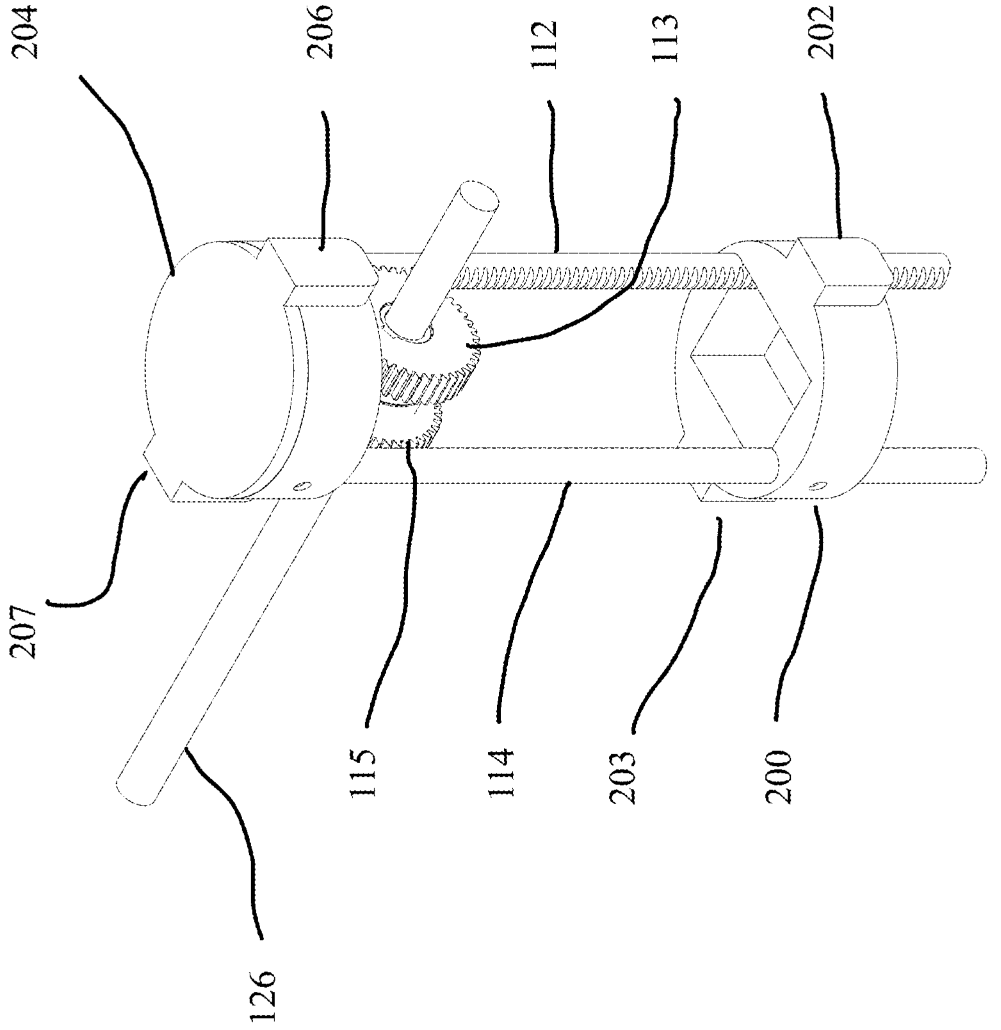
FIG. 7 is a partial perspective view thereof.

FIGS. 6 and 7 show the support collars 200, 204 that secure the toothed rails 112, 114 to the neck 108 for traveling across the rail gears 113, 115. The support collars 200, 204 are secured to the neck 108. In one embodiment, the support collars 200, 204 are bonded to the neck 108.

The support collars 200, 204 include a fastener aperture that accepts a fastener to secure the toothed rails 112, 114 to the support collars 200, 204. In one embodiment, the toothed rails include a threaded aperture for receiving the fastener. The support collars 200, 204 limit movement of the toothed rails 112, 114 that offset the toothed rails 112, 114 from the rail gears 113, 115.

Support fingers 202, 203, 206, 207 extend outwards from the support collars 200, 204. The support fingers 202, 203, 206, 207 insert into the vertical aperture 109 to stabilize the support collars 200, 204. Stabilizing the support collars 200, 204 also limits the movement of the toothed rails 112, 114 that offset the toothed rails 112, 114 from the rail gears 113, 115.

Figure 8:
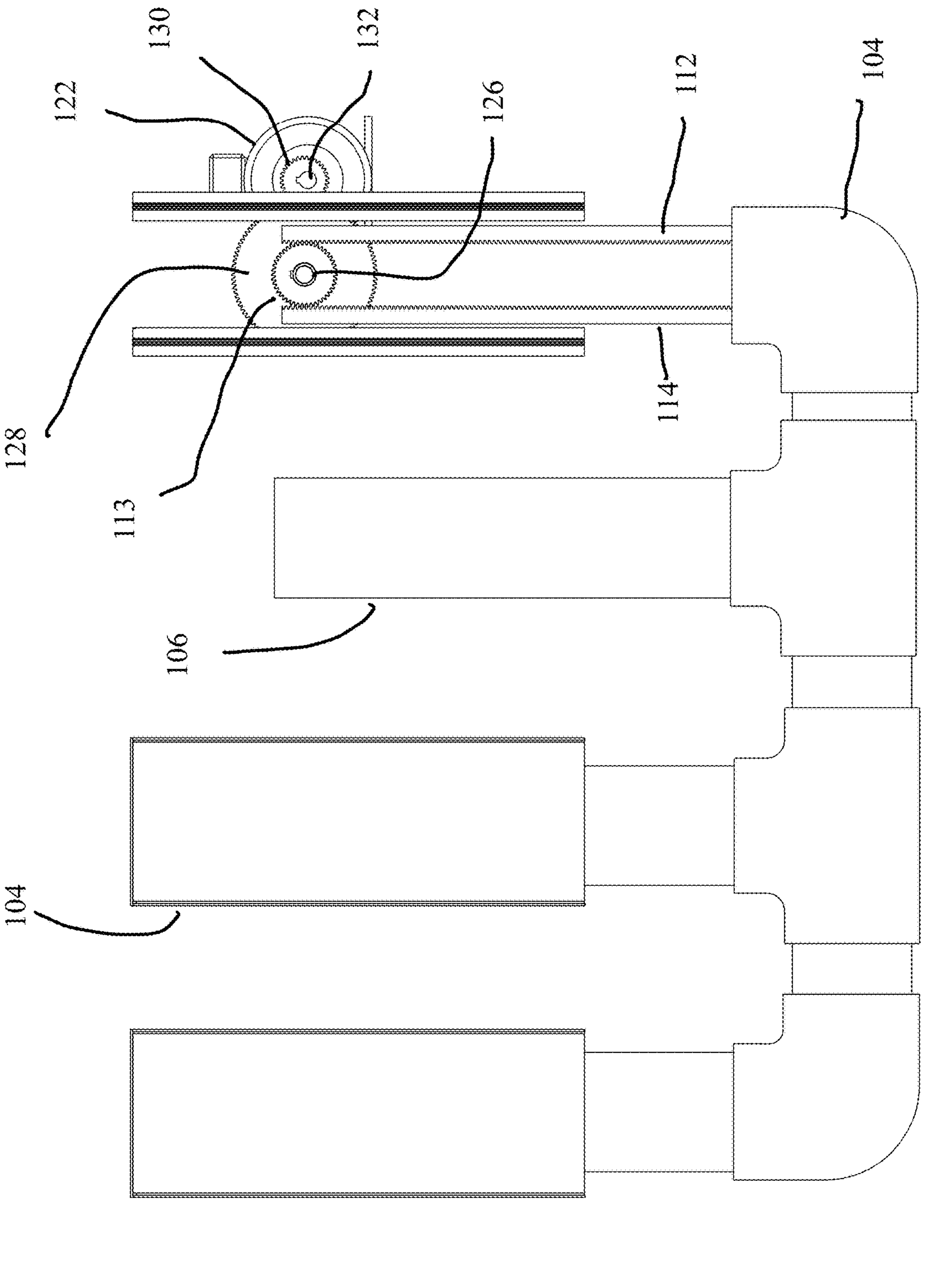
FIG. 8 is a partial right side view of the wave powered generator device and system of one embodiment of the present invention.
Figure 9:
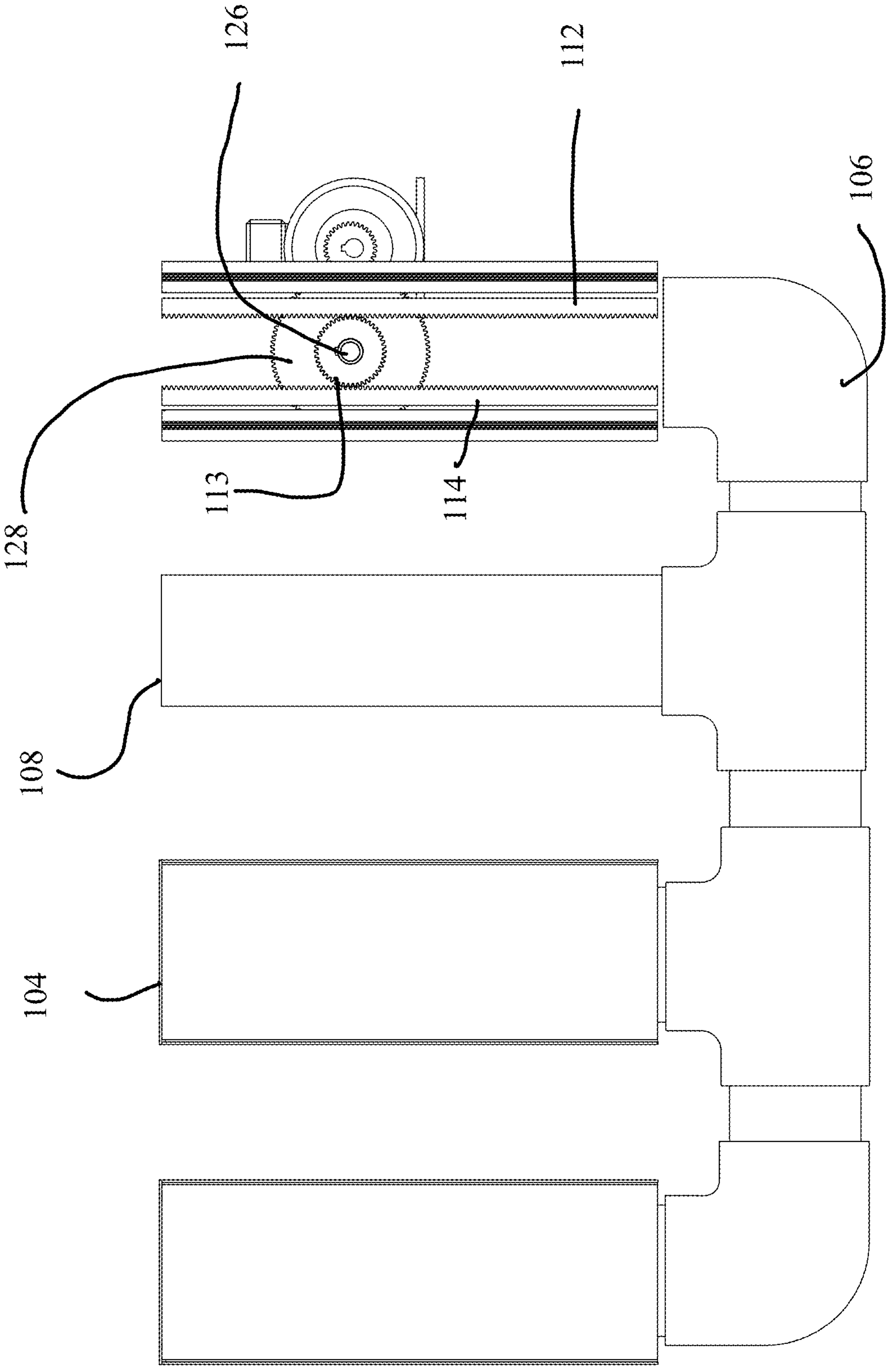
FIG. 9 is a partial right side view thereof.

FIGS. 8 and 9 show the vertical movement of the float body 106 and the drive system within the neck 108 (not shown). The toothed rails 112, 114 secured to the neck 108 move vertically upward and downward in relation to the rail gears 113, 115 during a tidal event. The movement of the toothed rails 112, 114 in relation to the rail gears 113, 115 rotate the axle 126 that rotates ratio gear 128. The ratio gear 128 then rotates the drive gear 130 that drives the drive shaft 132, such as the PTO, of the generator 122.

During the downward movement shown in FIG. 8 to FIG. 9, toothed rail 112 travels downward across rail gear 113. Toothed rail 114 also travels downward across rail gear 115. The one-way clutches coupled with each rail gear 113, 115 enable one rail gear 113, 115 to drive the axle 126 at a time. The toothed rails 112, 114 located on opposite sides of the rail gears 113, 115 drive the drive gear 130 and drive shaft 132 of the generator 122 during the vertical movement of neck 108 both upwards and downwards.

In one embodiment, the rail gears 113, 115 rotate the axle 126 in a generate direction. The axle 126 spinning in the generate direction rotates the ratio gear 128, drive gear 130, and the drive shaft 132 of the generator 122 to generate electricity. The one-way clutches coupled with the rail gears 113, 115 limit the rail gears 113, 115 from rotating the axle 126 in the non-generate direction. The rail gears 113, 115 spin freely from the axle 126 in the non-generate direction.

Vertical movement of the neck 108 and the toothed rails 112, 114 in a first direction, such as downward, rotates the rail gears 113, 115 in opposite directions due to the placement of toothed rails 112, 114 on opposite sides of the rail gears 113, 115. Toothed rail 112 rotates rail gear 113 in the generate direction, such as clockwise, when toothed rail 112 and neck 108 move in the first direction, such as downwards. Toothed rail 114 rotates rail gear 115 in the non-generate direction, such as counter-clockwise, when toothed rail 114 and neck 108 move in the first direction, such as downwards. Rail gear 113 rotates the axle 126 in the generate direction to drive the drive shaft 132 during the downward movement in the first direction of the toothed rail 112, neck 108, and float body 106. Rail gear 115 spins freely in the non-generate direction and does not rotate the axle 126 during downward movement in the first direction of the toothed rail 114, the neck 108, and float body 106.

Vertical movement of the neck 108 and the toothed rails 112, 114 in a second direction opposite of the first, such as upward, rotates the rail gears in opposite directions as movement of the head and toothed rails in the first direction. Toothed rail 112 rotates rail gear 113 in the non-generate direction, such as counterclockwise, when toothed rail 112 and neck 108 move in the second direction, such as upwards. Toothed rail 114 rotates rail gear 115 in the generate direction, such as clockwise, when toothed rail 114 and neck 108 move in the second direction, such as upwards. Rail gear 115 rotates the axle 126 to drive the drive shaft 132 during the upward movement in the second direction of the rail gear 115, the neck 108, and float body 106. Rail gear 113 spins freely in the non-generate direction and does not rotate the axle 126 during upward movement in the second direction of the toothed rail 112, the neck 108, and float body 106.

Figure 10:
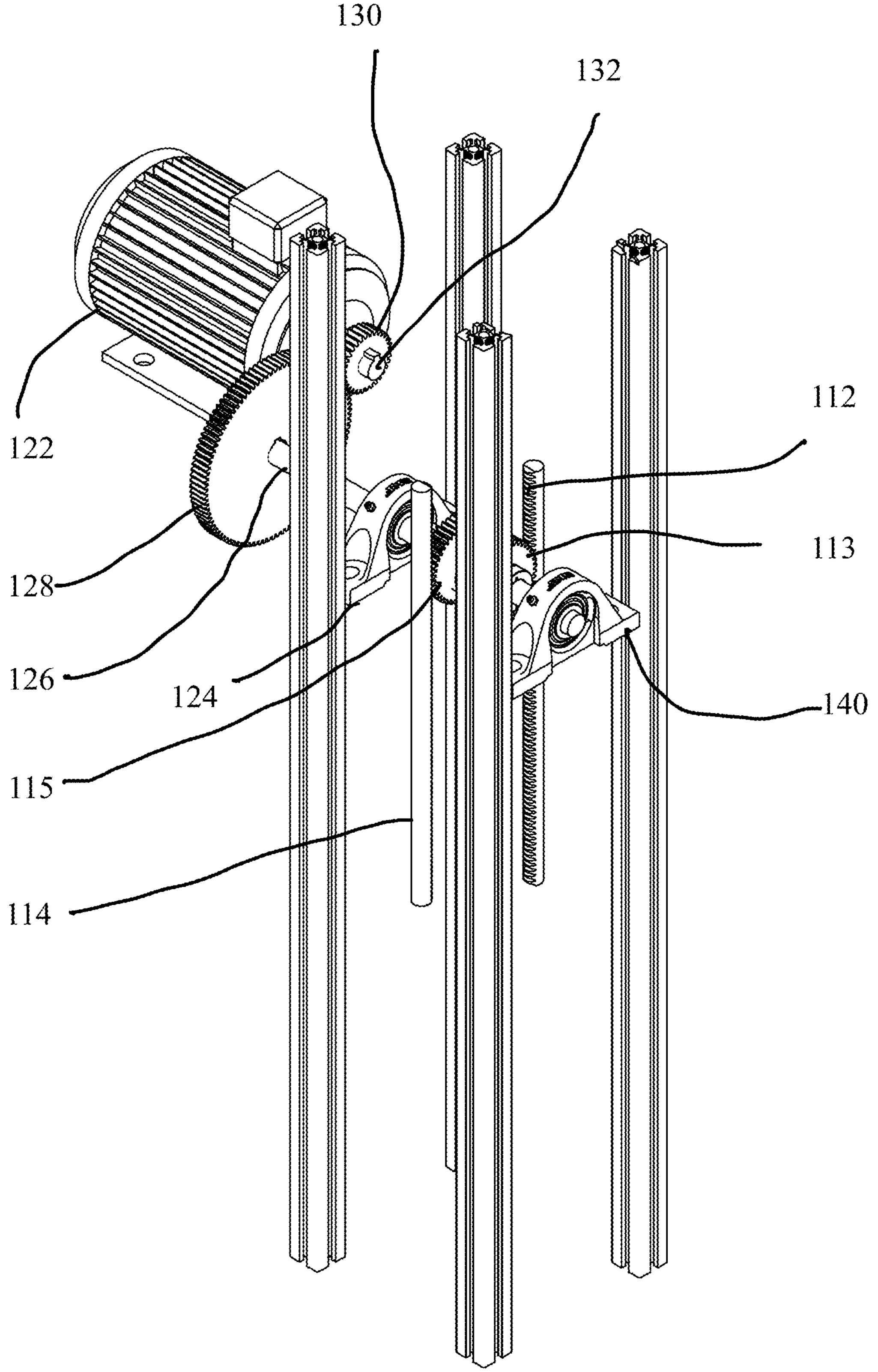
FIG. 10 is a partial perspective view of the wave drive system of one embodiment of the present invention.
Figure 11:
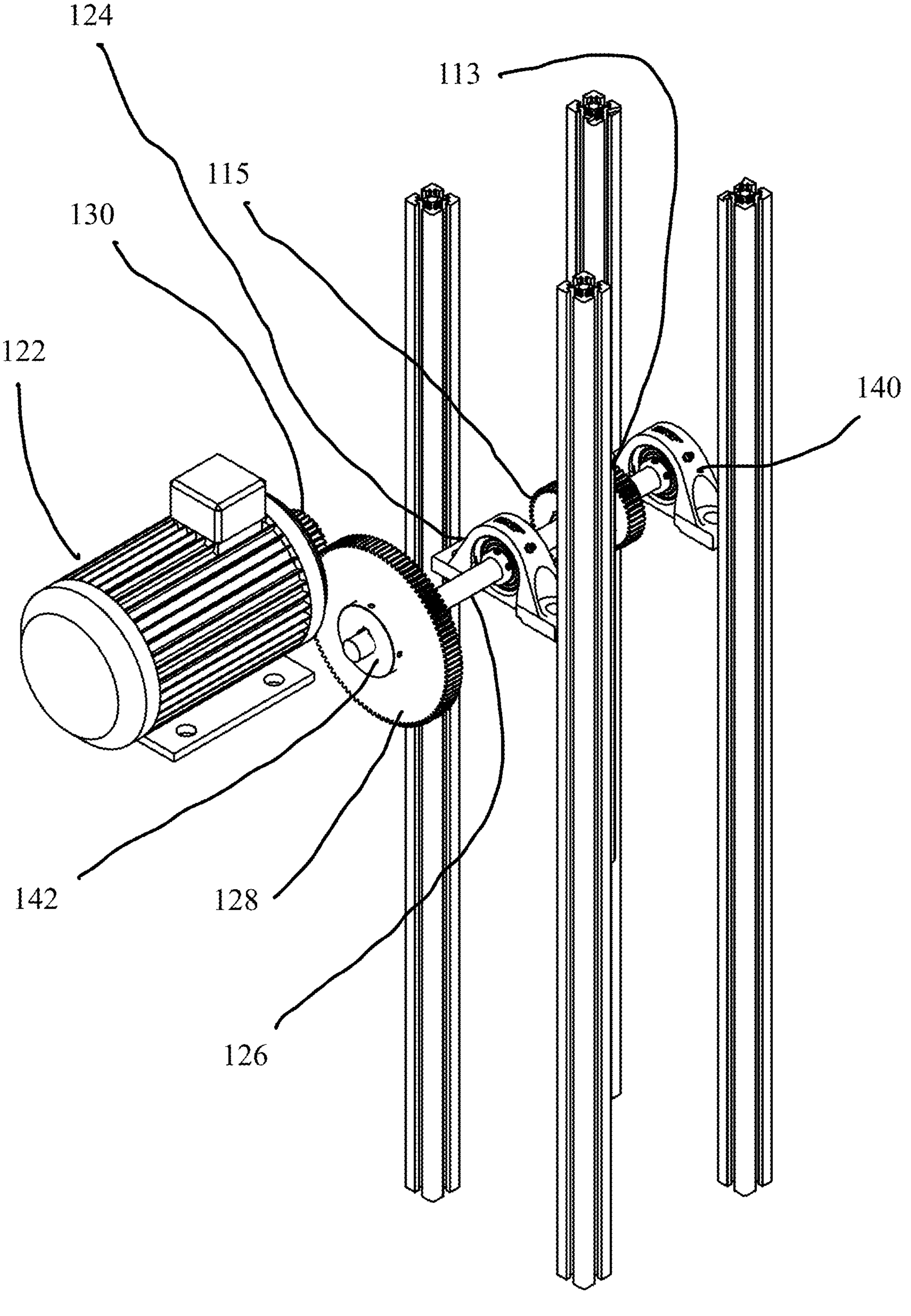
FIG. 11 is a partial perspective view thereof.

FIGS. 10 and 11 show the drive system 110 to drive the generator 122. The housing, drive housings, and float body are not shown. Toothed rails 112, 114 move vertically in a first direction and an opposite second direction in relation to the rail gears 113, 115. Toothed rail 112 rotates rail gear 113. Toothed rail 114 rotates rail gear 115. The toothed rails 112, 114 are located on opposite sides of the rail gears 113, 115 to drive the rail gears 113, 115 in opposite directions during movement of the toothed rails 112, 114 in the first and second directions.

Guide legs 116 limit movement of the neck and float body within the drive housing. The guide legs 116 are secured to the drive housing to remain in a fixed position in relation to the housing and the drive housing. Guide legs 116 maintain the positioning of rail gears 113, 115 with toothed rails 112, 114.

Generator 122 and bearing 124 are secured to the housing. Rotating the axle 126 in a generate direction, such as clockwise, generates power by driving the drive shaft 132 of generator 122. The rail gears 113, 115 rotate freely from the axle 126 in the non-generate direction, such as counterclockwise, such that the rail gears 113, 115 do not rotate the drive gear 130.

FIGS. 10 and 11 also show the bearings 124, 140, 142, such as pillow blocks. Bearings 124, 142 secure to the housing for rotating the axle 126. Bearing 140 secures to the drive housing to provide additional support at the end of the axle 126. The neck and toothed rails 112, 114 travel between the bearings 124, 140.

The drive system has been discussed as rotating the axle in a clockwise direction to generate electricity. The drive system may also rotate the axle in a counterclockwise direction to generate electricity and have the rail gears spin freely from the axle in the clockwise direction. The rail gears have been described as rotating in a set direction to generate electricity based upon movement of the toothed rails in select directions. Such directions may be reversed. The rail gears may also directly drive the drive shaft or different gear configurations may be implemented. The rail gears may also rotate in different directions. The system can also operate with a single rail gear or in a single direction. The use of two rail gears spinning in opposite directions drive the drive shaft of the generator during movement of the float body into two opposite vertical directions.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A generating system that generates electricity by driving a drive shaft of a generator with wave motion, the system comprising:

a drive housing having a central opening;

a float body positioned within the central opening such that the float body moves vertically within the central opening, wherein the float body is buoyant;

a first toothed rail secured to the float body, wherein the first toothed rail moves in a first direction and a second direction with the float body;

a first rail gear contacting the first toothed rail, wherein movement of the first toothed rail in the first direction rotates the first rail gear in a generating direction, wherein the first rail gear rotating in the generating direction drives the drive shaft of the generator; and a wall that separates the float body from the generator;

a second toothed rail secured to the float body, wherein the second toothed rail moves in the first direction and the second direction with the first toothed rail and the float body;

a second rail gear contacting the second toothed rail, wherein movement of the second toothed rail in the second direction rotates the second rail gear in the generating direction, wherein the second rail gear rotating in the generating direction drives the drive shaft of the generator;

wherein the first rail gear rotates freely in a non-generating direction when the first toothed rail moves in the second direction without driving the drive shaft of the generator, wherein the non-generating direction is opposite of the generating direction;

wherein the second rail gear rotates freely in the non-generating direction when the second toothed rail moves in the first direction without driving the drive shaft of the generator;

an axle connecting the first rail gear and the second rail gear, wherein the axle secures to the drive housing;

wherein the first toothed rail and the second toothed rail are located on opposite sides of the rail gears;

a vertical opening in the float body, wherein the axle passes through the vertical opening;

wherein the vertical opening enables the float body to travel vertically in relation to the axle;

wherein the axle passes from the drive housing through the wall towards the generator.

2. The system of claim 1 further comprising:

an air bladder within the float body;

an air pump connected to the air bladder, wherein the air pump is configured to add air to the air bladder.

3. A generating system that generates electricity by driving a drive shaft of a generator with wave motion, the system comprising:

a housing configured to store the generator;

a first drive housing positioned adjacent the housing, wherein the first drive housing forms a central opening;

a float body positioned below the first drive housing, wherein the float body is buoyant;

a first neck of the float body configured to extend vertically upward into the first drive housing to secure the float body with the first drive housing, wherein the first drive housing enables vertical movement of the first neck in a first vertical direction and a second vertical direction within the central opening, wherein the first neck moves vertically within the central opening;

a first toothed rail secured within the first neck, wherein the first toothed rail moves in the first vertical direction and the second vertical direction with the first neck;

a first rail gear contacting the first toothed rail within the first neck, wherein movement of the first toothed rail in the first vertical direction rotates the first rail gear in a generating direction, wherein the first rail gear rotating in the generating direction drives the drive shaft of the generator;

an axle secured to the first drive housing, wherein the first rail gear attaches to the axle;

a vertical opening in the first neck of the float body, wherein the axle passes through the vertical opening;

wherein the vertical opening enables the float body to travel vertically in relation to the axle secured to the first drive housing.

4. The system of claim 3 further comprising:

a second toothed rail secured within the first neck, wherein the second toothed rail moves in the first vertical direction and the second direction with the first toothed rail and the first neck;

a second rail gear contacting the second toothed rail, wherein movement of the second toothed rail in the second direction rotates the second rail gear in the generating direction, wherein the second rail gear rotating in the generating direction drives the drive shaft of the generator;

wherein the first rail gear rotates freely in the non-generating direction without driving the drive shaft of the generator when the first toothed rail moves in the second direction;

wherein the second rail gear rotates freely in the non-generating direction without driving the drive shaft of the generator when the second toothed rail moves in the first vertical direction.

5. The system of claim 4, wherein the axle connects the first rail gear and the second rail gear within the first neck;

wherein the first toothed rail and the second toothed rail are located on opposite sides of the rail gears and the neck.

6. The system of claim 4 further comprising:

a second drive housing positioned adjacent the housing, wherein the second drive housing forms a central opening;

the float body positioned below the second drive housing, wherein the float body is buoyant;

a second neck of the float body configured to extend vertically upward into the second drive housing to secure the float body with the second drive housing, wherein the second drive housing enables vertical movement of the second neck in a first vertical direction and a second vertical direction within the central opening, wherein the second neck moves vertically within the central opening;

a first toothed rail of the second neck secured within the second neck, wherein the first toothed rail of the second neck moves in the first vertical direction and the second vertical direction with the second neck;

a second rail gear contacting the first toothed rail of the second neck, wherein movement of the first toothed rail of the second neck in the first vertical direction rotates the second rail gear in the generating direction.

7. The system of claim 3 further comprising:

a wall that separates the float body from the generator, wherein the wall separates the float body from the generator;

wherein the axle passes from the drive housing through the vertical opening of the first neck and through the wall towards the generator.

8. A generating system that generates electricity by driving a drive shaft of a generator with wave motion, the system comprising:

a drive housing having a central opening;

a float body positioned within the central opening such that the float body moves vertically within the central opening, wherein the float body is buoyant;

a first toothed rail secured to the float body, wherein the first toothed rail moves in a first direction and a second direction with the float body;

a first rail gear contacting the first toothed rail, wherein movement of the first toothed rail in the first direction rotates the first rail gear in a generating direction, wherein the first rail gear rotating in the generating direction drives the drive shaft of the generator;

a second toothed rail secured to the float body, wherein the second toothed rail moves in the first direction and the second direction with the first toothed rail and the float body;

a second rail gear contacting the second toothed rail, wherein movement of the second toothed rail in the second direction rotates the second rail gear in the generating direction, wherein the second rail gear rotating in the generating direction drives the drive shaft of the generator;

wherein the first rail gear rotates in an opposite direction of the second rail gear during vertical movement of the float body;

an axle connecting the first rail gear and the second rail gear;

wherein the first toothed rail is located laterally apart from the second toothed rail, wherein the axle passes laterally between the first toothed rail and the second toothed rail;

wherein teeth of the first toothed rail extend laterally inward towards the axle;

wherein teeth of the second toothed rail extend laterally inward towards the axle;

wherein the axle positions the first rail gear and the second rail gear laterally between the first toothed rail and the second toothed rail.

9. The system of claim 8, wherein the axle extends longitudinally away from the generator, wherein the axle extends longitudinally between the first toothed rail gear and the second toothed rail gear;

wherein the first rail gear is longitudinally offset from the second rail gear.

10. The system of claim 9, wherein the first toothed rail is longitudinally offset from the second toothed rail.

* * * * *